May 8, 1934.  S. SADLER  1,958,069
TRANSMISSION BELT AND METHOD AND APPARATUS FOR MAKING THE SAME

Filed Sept. 3, 1930

INVENTOR
SETH SADLER.
BY
Usina & Rauber
ATTORNEYS

Patented May 8, 1934

1,958,069

UNITED STATES PATENT OFFICE 1,958,069

TRANSMISSION BELT AND METHOD AND APPARATUS FOR MAKING THE SAME

Seth Sadler, Birmingham, England, assignor, by mesne assignments, to Dunlop Tire & Rubber Corporation, Buffalo, N. Y., a corporation of New York Application September 3, 1930, Serial No. 479,548
In Great Britain October 12, 1929

8 Claims. (Cl. 74—232)

This invention relates to endless transmission belts and the manufacture thereof and refers more particularly to the class of belt composed of rubbered fabric.

Heretofore, for the manufacture of the class of belts referred to, a cylindrical mandrel has been employed and the necessary number of sheets of rubbered fabric have been wrapped thereabout and wrapped or rolled laterally thereupon into a member of laminated formation, the sheets being of a determinate width to give the necessary amount of laminations and cross sectional area to the belt, and of a length slightly greater than the circumference of the mandrel to enable their edges to be overlapped to produce an endless structure.

However, the overlapped edges resulted in a local enlargement, which prevented the belt in use from running evenly. Further, union of the overlapped edges was effected only by the adhesion of the rubber applied to the fabric and the belt was comparatively weak thereabout.

An object of this invention is to provide an economical method for constructing belts of the kind aforesaid of even thickness throughout and whereby the fabric possesses a number of unbroken lengths extending completely around the belt.

Another object of this invention is to dispose the primary cords of the fabric parallel to the line of force at which the belt operates, and to provide thereby a belt of maximum strength and one that is substantially stretchless.

According to my invention vulcanized fabricated rubber endless transmission belts have a side rolled multiple layer fabric content of rubbered straight cut or cord fabric disposed in a plurality of convolutions circumferentially of the belt, and if desired encased in a supplementary wrapping of similar or other rubbered fabric.

The rubbered straight cut or cord fabric herein referred to is preferably a continuous length of woven fabric having its warp threads disposed longitudinally of the fabric and coated with or embedded in rubber in any suitable manner, or a fabric composed of warp threads only, similarly coated with or embedded in rubber.

The method of manufacturing belts in accordance with this invention comprises first winding—preferably helically—a length of rubbered straight cut or cord fabric upon a cylindrical former into a flat band the edges of the wrappings preferably overlapping one another. Next the wrapping is rolled sidewise upon itself along the former into ring form and afterwards the belt is transferred from the former into a suitably shaped mould wherein the ring is shaped and cured.

If desired, an encasement of rubbered fabric may be wound around the ring previously described prior to shaping and curing, the encasement conveniently being of bias cut rubbered fabric wound on the former adjacent the straight cut or cord fabric and wound thereabout in a common rolling operation, in continuation of rolling the straight cut or cord fabric.

This invention also contemplates the provision of means for facilitating the ready application of the belts to the moulds and comprises rolling the belts from the matrix or former on to a supplementary ring which has an outer circumference and contour corresponding to the mould in order that the belt may be rolled directly thereon without difficulty.

As the belts preferably are moulded in a stretched condition to ensure of the component fabric properly bedding in the belt and to remove any irregularity from the belt the supplementary ring may be conical, the greater dimension of the supplementary ring being adapted to lie against the mould, whereby in traversing the belt along the supplementary ring, it is tensioned longitudinally.

In order that this invention may be clearly understood and readily carried into practice, we have given by way of example in the accompanying drawing and description illustrations of separate stages in a suitable process for manufacturing the belts.

The material for the belts, which must necessarily in the finished article be of the rubbered variety, may be of any suitable manufacture and the fabric and rubber may be combined either before or after winding on the mandrel.

However, it is more convenient to combine the two substances before manufacture of the belts, into indefinite lengths of the desired width, say by surface coating either a previously treated or untreated fabric with rubber by spreading, calendering, spraying or other known means, or by immersing a previously rubber treated or untreated fabric in a solution or concentrate of rubber.

The rubber employed may be pure form, i. e. natural rubber compounded and mixed with known ingredients either in a plastic or liquid state, or it may be of the known substances regarded as artificial or synthetic rubber with or without an admixture of known ingredients.

Also the content of the fabric itself may be or known matter, either in part or completely of either or both vegetable and animal fibres or other natural or artificial matter known to be suitable for the purpose.

When an unwoven fabric or weftless fabric as it is termed, is used, the cords thereof will run longitudinally of the fabric and for a woven fabric, some at least of its cords, preferably the warp cords, likewise will extend longitudinally of the fabric.

The various features of the invention are illustrated in the accompanying drawing, in which Fig. 1 is a view showing the manner of making the initial wrapping of rubberized fabric on a mandrel.

Figure 1:
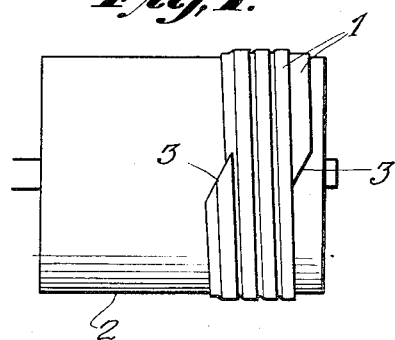
Figure 2:
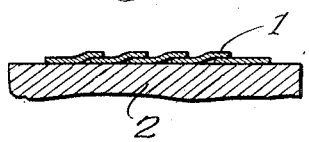
Fig. 2 is an enlarged sectional detail of a part of the mandrel and wrapping showing the manner of overlapping successive wrappings.

In making an endless belt composed of two distinct forms of material, a length of rubbered fabric 1 of the kind heretofore described—for choice rubbered weftless cord fabric—is wound spirally upon a parallel sided drum 2, Fig. 1, with preferably a subsequent turn or convolution partly or otherwise overlapping a previous turn, as shown more clearly in Fig. 2 which is a detail view in cross section. The drum 2 is supported preferably rotatably by suitable means (not shown) and has a diameter approximating the internal diameter of a finished belt.

The width and number of convolutions of the material 1 are determined by the cross section of the belt to be formed and the ends 3 are preferably chamfered and adapted to terminate at corresponding positions on opposite edges of the belt.

Figure 3:
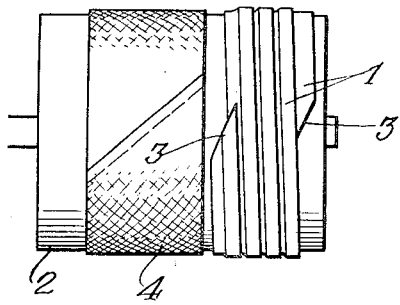
Fig. 3 is a view similar to that of Fig. 1, showing the wrapping of a successive layer of fabric to form an outer wrapping of the finished belt.

During the next operation, Fig. 3, one or more wrappings of rubbered canvas designated 4 cut on the bias and of a width to make a determined number of turns around the cord fabric, is wound around the drum 2 alongside the cord fabric and slightly overlapped at its ends.

Figure 4:
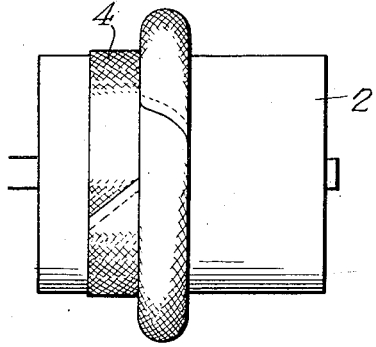
Fig. 4 is a view similar to that of Figures 1 and 3, showing the wrapping being rolled sidewise or longitudinally of the mandrel.

Next the fabric is subjected to a rolling operation, the finishing part of which is shown in Fig. 4, the fabric 1 being engaged first and rolled sidewise into a ring, towards and on to the canvas 4 which is then caught up and rolled around the fabric 1.

A ring having the primary cords at least of the fabric lying parallel to the centre line of the belt now results.

The belt is now ready for moulding and vulcanizing which are carried out by any known means.

An important factor in the manufacture for the purpose of ensuring that the belts are true and have other desirable characteristics associated with the use of the belts, for instance, a closely compacted evenly disposed fabric content it is customary to tension the belts in manufacture and in some instances during moulding.

Whilst this occurs naturally, so to speak, in the process outlined we find it to be of advantage, to tension it further, to make it upon a former of a slightly less diameter than the internal diameter of a finished belt and transfer it to a mould of a diameter equal to that of the finished belt.

Figure 5:
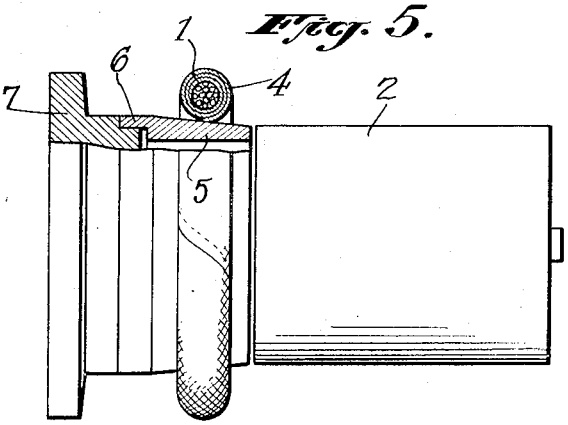
Fig. 5 is a view showing the manner in which the rolled wrappings are transferred to a mould or former.

This is facilitated considerably by employing a frusto conical transfer ring 5 shown in Fig. 5 in section, flanged at 6 to engage a correspondingly shaped stepped part of the mould member 7 from which it receives support.

In the subsequent steps of disengaging the mould from the transfer ring, applying a companion part or parts to the mould to impart the necessary cross-section to the belt and finally vulcanizing, may be accomplished with any of the usual apparatus and are therefore not illustrated in the drawing.

If desired, in an alternative construction of belt the canvas content 4 may be omitted and the amount of material 1 increased accordingly. Or whether the canvas is or is not employed, more than one length of material such as 1 may be used and not necessarily of the same thickness or gauge.

Again, in addition to the foregoing the belt may be made around and provided with a core of fabric of known form.

Also I may include other constituents if desired and modify the methods for manufacturing the belts providing that the belt has got within it at least one length of fabric which extends more than once, unbroken, longitudinally of the belt.

Thus, instead of employing one independent frusto conical transfer ring, the former or drum 2 may have an integral gradually increasing part.

What I claim is:—

1. Endless vulcanized fabricated rubber transmission belts having a continuous rubbered strip fabric laid circumferentially of the belt in a plurality of convolutions and in spiral arrangement in transverse cross section.

2. Endless vulcanized fabricated rubber transmission belts having a continuous strip of rubbered straight cut fabric laid circumferentially of the belt in a plurality of convolutions and in spiral arrangement in transverse cross section.

3. Endless transmission belts according to claim 1, wherein the ends of the strip fabric are arranged at substantially the same transverse position within the belt.

4. Endless transmission belts according to claim 1, layers of bias cut fabric.

5. An endless transmission belt having a continuous strip of rubbered straight cut fabric laid circumferentially of the belt in a plurality of convolutions and in spiral arrangement in transverse cross section, and an outer layer of bias-cut rubbered fabric.

6. An endless transmission belt of rubberized fabric comprising a core of sidewise overlapping fabric layers, in spiral formation in transverse cross section, said layers being continuous one to another circumferentially, and an outer wrapping of bias fabric.

7. The belt of claim 6 in which the ends of said core fabric are bias cut and are in substantially the same circumferential position.

8. An endless transmission belt of rubberized fabric comprising a core of fabric layers in spiral formation in transverse cross section, said layers being continuous one to another circumferentially, and an outer wrapping of bias cut fabric.

SETH SADLER.